(12) United States Patent
Chrestenson

(10) Patent No.: US 6,186,449 B1
(45) Date of Patent: Feb. 13, 2001

(54) WASTE DISCHARGE CONDUIT SUPPORT

(76) Inventor: Robert A. Chrestenson, 981 Randy Way, Brentwood, CA (US) 94513

( * ) Notice: Under 35 U.S.C. 154(b), the term of this patent shall be extended for 0 days.

(21) Appl. No.: 09/343,322

(22) Filed: Jun. 30, 1999

(51) Int. Cl.$^7$ .................................................. F16L 3/16
(52) U.S. Cl. .............................. 248/49; 248/65; 248/70; 248/81
(58) Field of Search ................... 248/49, 65, 70, 248/75, 80, 81, 440, 27.5, 460, 447; 285/61, 66

(56) References Cited

U.S. PATENT DOCUMENTS

| | | | |
|---|---|---|---|
| 587,775 | * | 8/1897 | Yockel .................................... 248/75 |
| 1,933,919 | * | 11/1933 | McPherson ............................... 239/1 |
| 2,537,703 | * | 1/1951 | Randa ..................................... 248/75 |
| 3,767,149 | * | 10/1973 | Hill ........................................ 248/49 |
| 3,809,348 | * | 5/1974 | De Laura ................................ 248/49 |
| 4,228,978 | * | 10/1980 | Rand ....................................... 248/49 |
| 4,406,434 | * | 9/1983 | Schneckloth ........................... 248/83 |
| 4,712,755 | * | 12/1987 | Robbins et al. ........................ 248/49 |
| 4,722,500 | * | 2/1988 | Bray ....................................... 248/49 |
| 5,033,702 | * | 7/1991 | Robbins ................................. 248/83 |
| 5,054,723 | * | 10/1991 | Arnold ................................... 248/65 |
| 5,067,679 | * | 11/1991 | Courtney ............................... 248/75 |
| 5,311,909 | * | 5/1994 | Adcock ................................. 137/899 |
| 5,431,455 | * | 7/1995 | Seely ..................................... 285/61 |
| 5,788,193 | * | 8/1998 | Hilbert .................................. 248/80 |
| 5,871,182 | * | 2/1999 | Johnson et al. ........................ 248/49 |
| 5,871,306 | * | 2/1999 | Tilcox ................................... 405/157 |

* cited by examiner

Primary Examiner—Anita M. King
Assistant Examiner—Naschica C Sanders
(74) Attorney, Agent, or Firm—Thomas R. Lampe

(57) ABSTRACT

Apparatus for supporting a fluent material conduit includes a plurality of support units having different sizes. Each support unit includes two support members pivotally attached to one another at one end thereof and having a concavity at the other end thereof for receiving a conduit. The apparatus also includes a lock for locking the support members against relative pivotal movement to retain the upper ends of the support members a desired distance from one another.

11 Claims, 3 Drawing Sheets

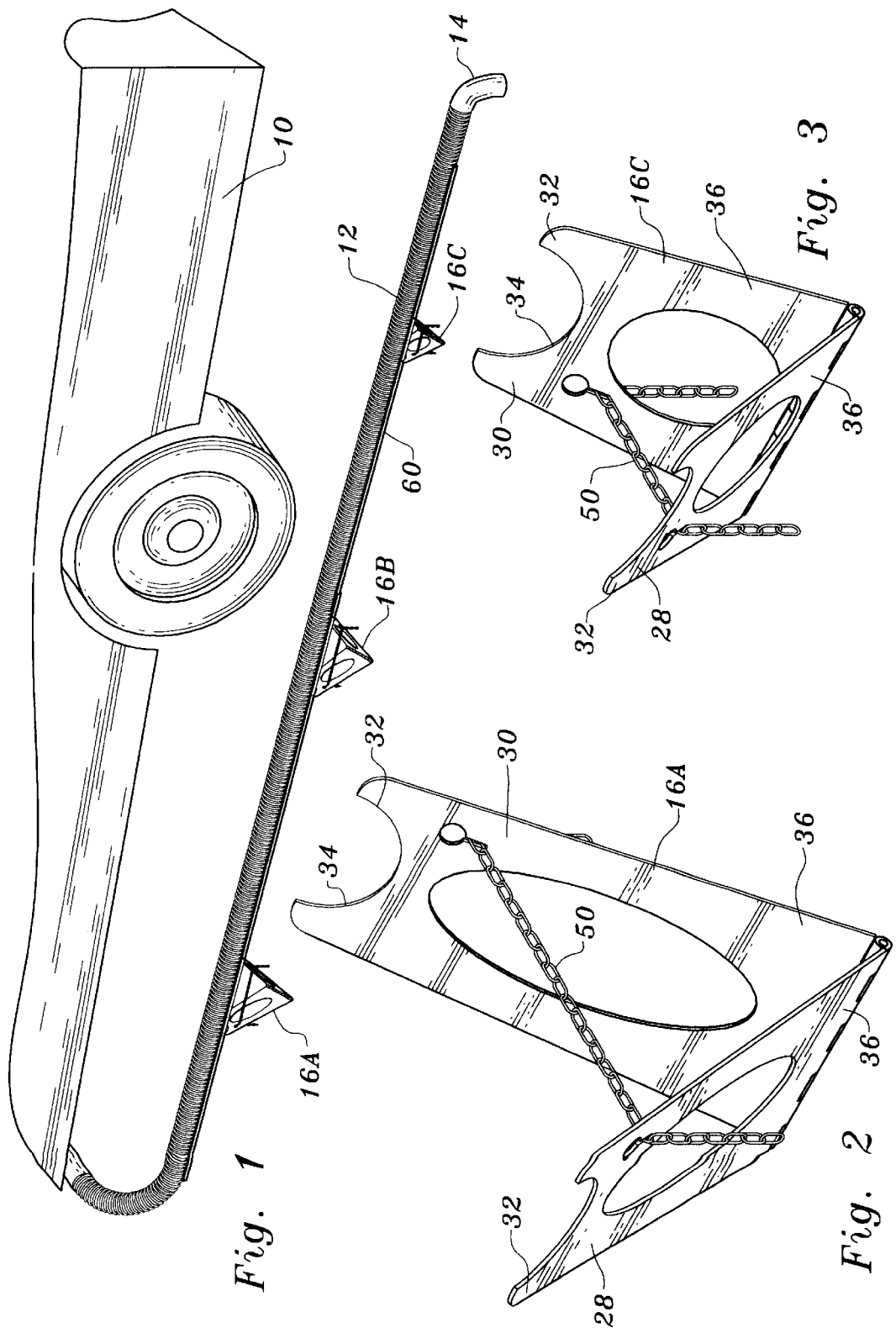

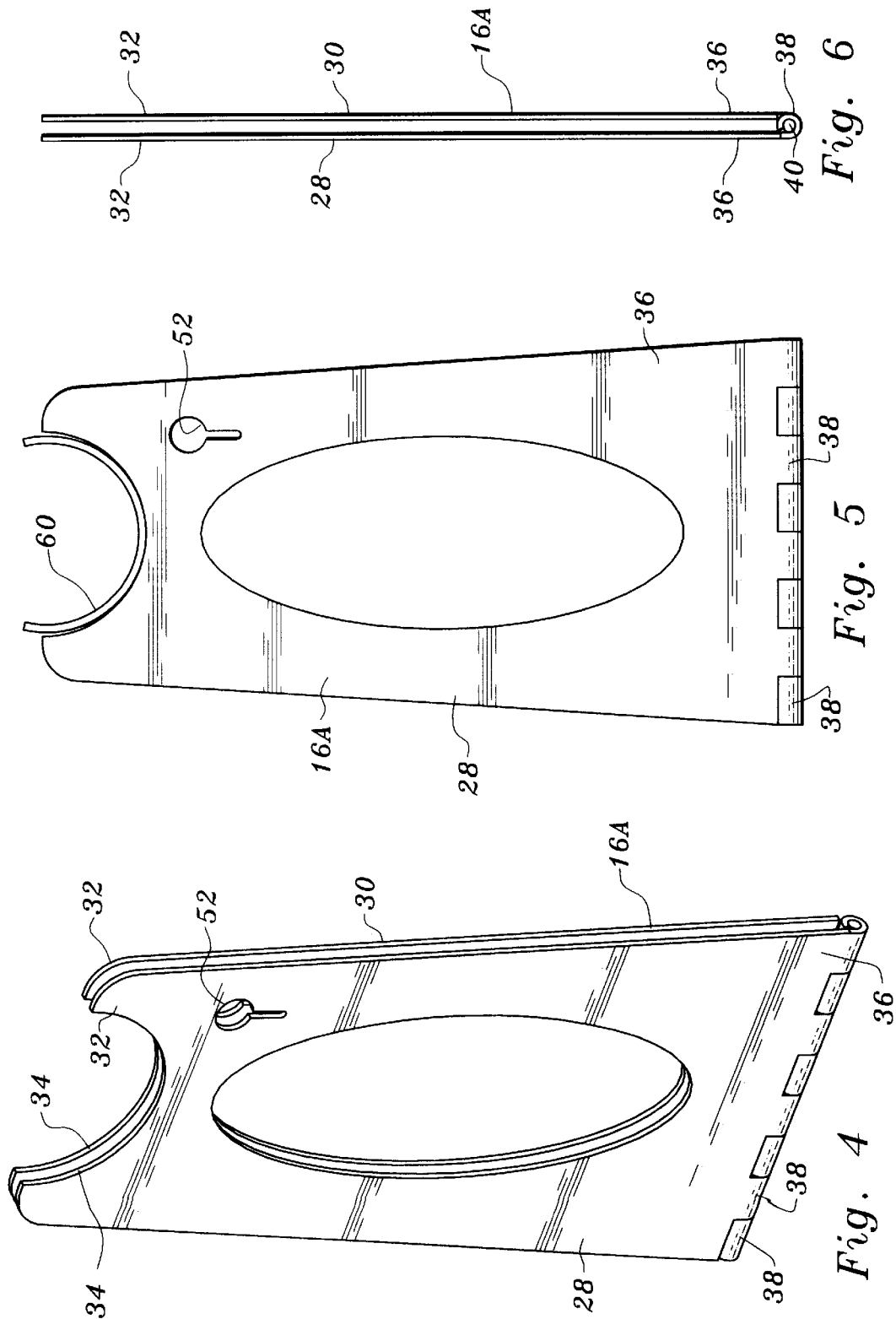

WASTE DISCHARGE CONDUIT SUPPORT

TECHNICAL FIELD

This invention relates to apparatus for supporting a conduit for transporting fluent material above the surface. The invention has particular application to waste discharge conduits such as those employed in association with recreational vehicles, campers and trailer homes.

BACKGROUND OF THE INVENTION

It is common practice to discharge waste from recreational vehicles, trailer homes, campers and the like through conduits which receive effluent from a discharge outlet and convey the material to a holding tank, treatment facility or other location.

Typically, waste discharge conduits are maintained in a non-level condition to allow discharge under the influence of gravity, the conduits being positioned at the desired altitude and orientation by supports in the form of stacks of bricks, boards or other objects which are at hand. Not only does this present an unsightly appearance, the person carrying out the discharge operation may have difficulty providing proper stability and placement of the conduit. Furthermore, such objects are not always readily available at the discharge site, the alternative being to carry such objects around in the vehicle. This uses up valuable space and can be highly inconvenient, particularly when the support objects are bulky and heavy, an example being bricks or cement blocks.

DISCLOSURE OF INVENTION

The present invention relates to apparatus which quickly and reliably can be used to support a conduit for transporting fluent material above a surface in a highly stable manner. Furthermore, the apparatus may be quickly installed in place. During use the apparatus presents a pleasing appearance as compared to typical supports currently employed. Furthermore, the apparatus assumes a very compact configuration when not in use so that it can be readily transported and stowed away in a vehicle.

The apparatus includes a first support member having an upper end and a lower end, the upper end of the first support member being positionable adjacent to and under a conduit and the lower end of the first support member being positionable at a surface.

The apparatus also includes a second support member having an upper end and a lower end, the upper end of the second support member being positionable adjacent to and under the conduit next to the upper end of the first support member and the lower end of the second support member being positionable at a surface.

Hinge means hingedly connects the first and second support members at the lower ends thereof whereby the upper ends of the first and second support members can be moved toward or away from one another upon relative pivotal movement of the first and second support members at the hinge means.

A Lock means is cooperable with the first and second support members for selectively locking the first and second support members against relative movement to retain the upper ends of the first and second support members a desired distance from one another. The disclosed apparatus includes a plurality of support units to be spaced from one another along a length of the conduit being supported, the support units being of different sizes.

Other features, advantages, and objects of the present invention will become apparent with reference to the following description and accompanying drawings.

BRIEF DESCRIPTION OF DRAWINGS

FIG. 1 is a perspective view illustrating a conduit receiving waste from a vehicle and supported by apparatus constructed in accordance with the teachings of the present invention, the apparatus comprising three spaced individual support units of different sizes;

FIG. 2 is a perspective view of one of the support units in the position assumed thereby when supporting a conduit;

FIG. 3 is a view similar to FIG. 2 but illustrating a support unit smaller than that of FIG. 2;

FIG. 4 is a perspective view illustrating the support unit of FIG. 2 in collapsed condition with support members thereof being closely adjacent to one another and parallel;

FIG. 5 is a side elevational view of the support unit of FIG. 2 supporting a conduit holder, only a portion of the conduit holder being illustrated;

FIG. 6 is a frontal view of the support unit in the configuration shown in FIG. 4 with the support members thereof disposed parallel to one another;

BEST MODE FOR CARRYING OUT THE INVENTION

Figure 7:
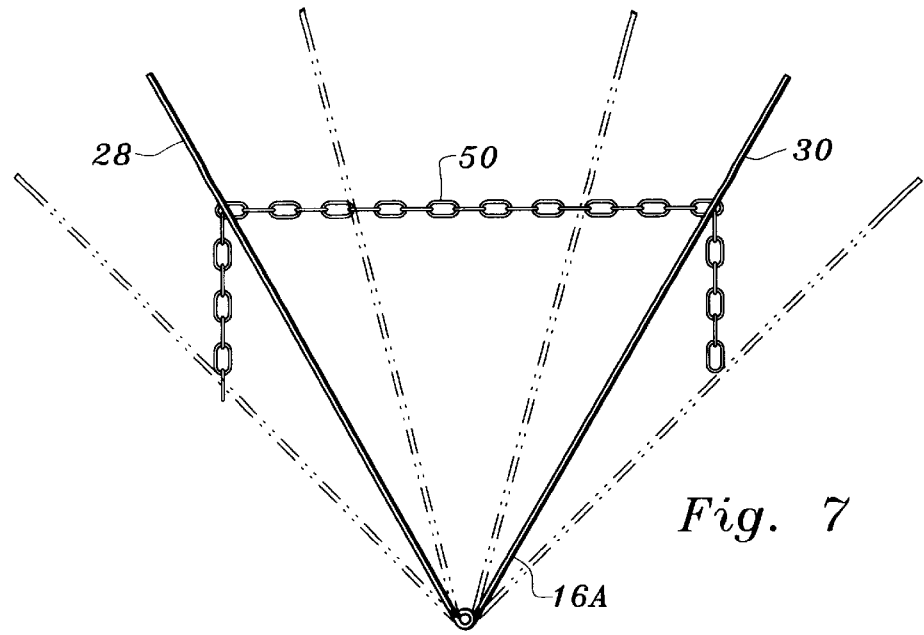
FIG. 7 is a frontal view illustrating the support members of a support unit being locked in place against pivotal movement by a chain extending between the support members, phantom lines being employed to illustrate representative alternate positions assumable by the support members.

FIG. 1 shows a portion of a recreational vehicle 10 discharging waste through a conduit 12 having the inlet thereof attached to the recreational vehicle. The other end, end 14, of the conduit is open to allow discharge of the fluent material received from the recreational vehicle.

Disposed on a surface under conduit 12 are support units 16A, 16B and 16C. Support unit 16A is larger than unit 16B and support unit 16B is larger than unit 16C, the purpose of the support units being to maintain the conduit at an angle to the horizontal so that end 14 is disposed lowermost and discharge of the fluent material passing through the conduit is promoted by gravity.

The support units 16A, 16B and 16C incorporate the same structural elements and differ only in respect to size and configuration.

Each support unit includes support members 28, 30 in the form of flat plates, preferably made of steel or the like. However, any suitable material, such as aluminum or plastic, can be used. The support members 28, 30 have top ends 32 defining concavities 34 for receiving the conduit 12.

The lower ends 36 of the support units are segmented and curved to form hinge elements 38 looping about hinge pin 40. The support members 28, 30 can thus be readily pivoted relative to one another at the hinge means to move the upper ends thereof toward or away from one another. FIG. 7 shows different representative positions assumable by the support members. It will be appreciated that the concavities 34 defined by the support members are closer to the ground when the top ends of the support members are further apart and located further away from the ground the closer the top ends are brought together.

A flexible chain 50 extends between the support members 28, 30 between the top ends and lower ends thereof to selectively lock the support members against relative pivotal movement to retain the upper ends of the support members a desired distance from one another. The chain links pass through openings 52 in the support members, the bottoms of the openings being narrow so that the chain links can be set and locked into abutting engagement with the support members.

It will thus be seen that the heights of the concavities 34 of the support units from the ground can be varied in two ways. The concavities of the smaller support units are necessarily closer to the ground than the concavities of the larger units when the support members thereof are disposed at the same angles. On the other hand, the heights of the concavities of each individual support unit can also be varied through use of the hinge and interconnecting chain arrangement. Larger holes may be formed in the support members as shown to reduce the overall weight thereof.

Figure 8:
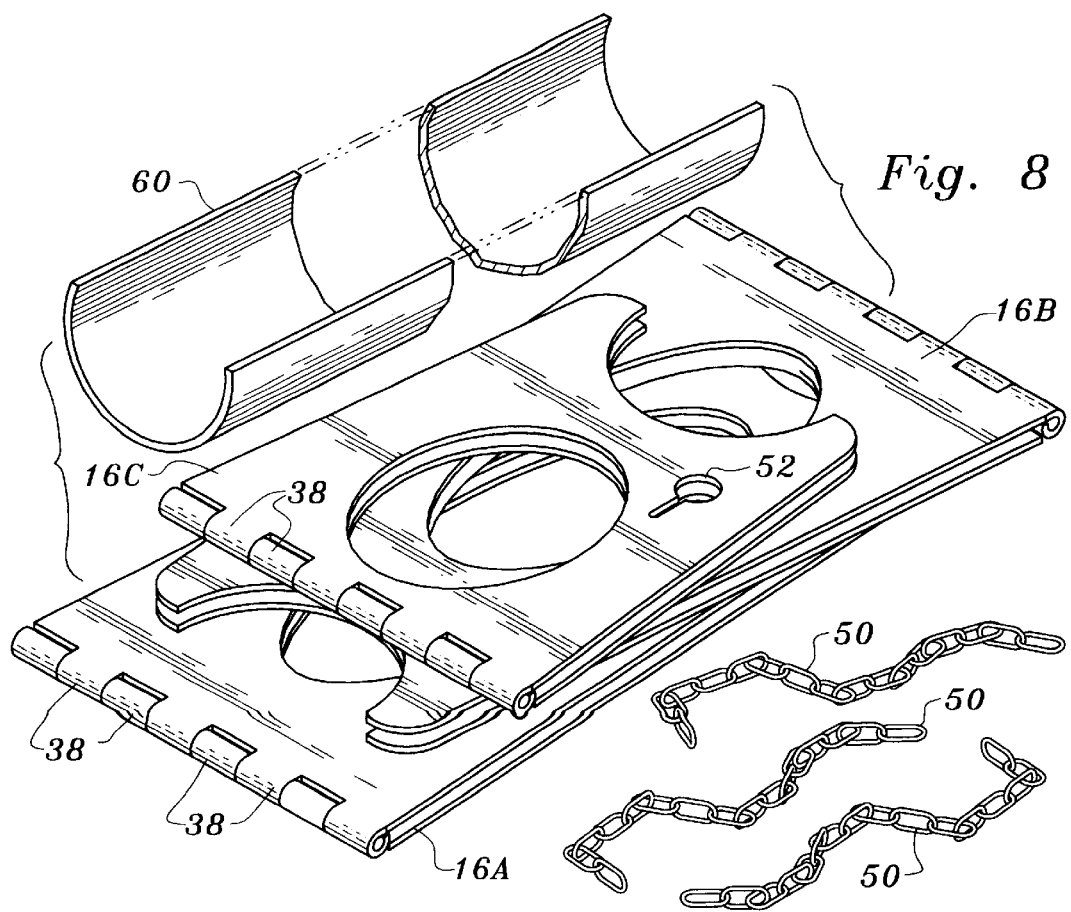
FIG. 8 is a perspective view illustrating three support units in collapsed condition for storage along with lock chains.

The support units may be collapsed so that the support members are in parallel relationship, as shown for example in FIGS. 4, 6 and 8. This allows the apparatus to assume a very compact configuration. FIG. 8 shows all three support units 16A, 16B and 16C collapsed with the chains 50 thereof disposed alongside.

In the arrangement illustrated, it is assumed that the conduit 12 is somewhat flexible. For this reason, a conduit holder in the form of an open topped, inflexible channel 60 extends between the support units and is disposed between the conduit and the support units. Of course, such a channel is not needed in those instances where the conduit itself is relatively inflexible.

What is claimed is:

1. Apparatus for supporting a conduit for transporting fluent material above a surface, said apparatus comprising, in combination:

a first support member having an upper end and a lower end, said upper end of said first support member positionable adjacent to and under the conduit and the lower end of said first support member positionable at the surface;

a second support member having an upper end and a lower end, said upper end of said second support member positionable adjacent to and under the conduit next to the upper end of said first support member and the lower end of said second support member positionable at the surface;

hinge means hingedly connecting said first and second support members at the lower ends thereof whereby the upper ends of said first and second support members can be moved toward or away from one another upon relative pivotal movement of said first and second support members at said hinge means; and lock means cooperable with said first and second support members for selectively locking said first and second support members against relative pivotal movement to retain the upper ends of said first and second support members a desired distance from one another, said lock means comprising a structural element extending between said first and second support members and interconnected to said first and second support members at locations between the upper ends and lower ends of said first and second support members, and said structural element being releasably connected to at least one of said first and second support members whereby positioning of the structural element relative to at least one of said first and second support members can be changed to vary the length of said structural element positioned between the first and second support members and modify the distance between the upper ends of said first and second support members.

2. The apparatus according to claim 1 wherein said structural element is elongated and flexible.

3. The apparatus according to claim 2 wherein said structural element comprises a chain.

4. The apparatus according to claim 1 wherein said first and second support members define concavities at the upper ends thereof for receiving the conduit to retain the conduit at a fixed location and orientation relative to said surface.

5. The apparatus according to claim 1 wherein said first and second support members comprise flat plates, said flat plates being selectively movable about said hinge means into abutting substantially parallel relationship.

6. Apparatus for supporting a conduit transporting fluent material in a predetermined direction of fluent material flow above a surface and for maintaining the conduit at an angle to a horizontal plane, said apparatus including a plurality of support units to be spaced from one another along a length of the conduit, said support units being of differing sizes and each support unit including at least one support member having an upper end and a lower end, said upper end positionable adjacent to and under the conduit and the lower end of the support member positionable at the surface, the sizes of the support units of said plurality of support units decreasing in the predetermined direction of fluent material flow through the conduit whereby transport of the fluent material through the conduit is caused by gravity, each support unit including a first support member having an upper end and a lower end, said upper end of said first support member positionable adjacent to and under the conduit and the lower end of said first support member positionable at the surface, a second support member having an upper end and a lower end, said upper end of said second support member positionable adjacent to and under the conduit next to the upper end of said first support member and the lower end of said second support member positionable at the surface, hinge means hingedly connecting said first and second support members at the lower ends thereof whereby the upper ends of said first and second support members can be moved toward or away from one another upon relative pivotal movement of said first and second support members at said hinge means, and lock means cooperable with said first and second support members for selectively locking said first and second support members against relative pivotal movement to retain the upper ends of said first and second support members a desired distance from one another, said lock means comprising a structural element extending between said first and second support members and interconnected to said first and second support members at locations between the upper ends and lower ends of said first and second support members, said structural element being releasably connected to at least one of said first and second support members whereby positioning of the structural element relative to at least one of said first and second support members can be changed to vary the length of said structural element positioned between the first and second support members and modify the distance between the upper ends of said first and second support members.

7. The apparatus according to claim 6 wherein the support member of each support unit defines a concavity at the upper end thereof for receiving the conduit and retaining the conduit at a fixed location and orientation relative to said surface.

8. The apparatus according to claim 6 wherein said structural element is elongated and flexible.

9. The apparatus according to claim 8 wherein said structural element comprises a chain.

10. The apparatus according to claim 6 wherein said first and second support members define concavities at the upper ends thereof for receiving the conduit to retain the conduit at a fixed location and orientation relative to said surface.

11. The apparatus according to claim 8 wherein said first and second support members comprise flat plates, said flat plates being selectively movable about said hinge means into abutting substantially parallel relationship.

* * * * *